Feb. 23, 1971     W. A. CORDON     3,565,650
LIGHTWEIGHT CONCRETE PRODUCTS AND A PROCESS OF PRODUCING SAME
Filed May 18, 1966
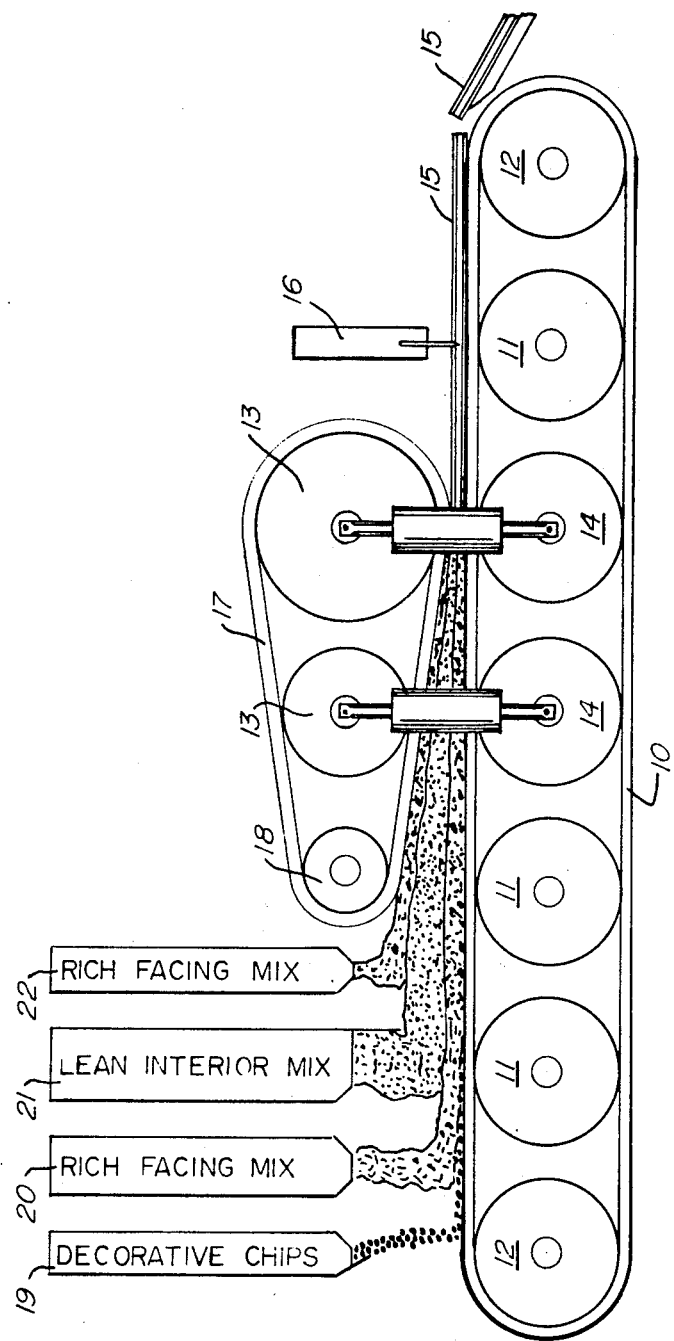
INVENTOR:
WILLIAM A. CORDON.
BY: MALLINCKRODT &
MALLINCKRODT
ATTORNEYS.

United States Patent Office 3,565,650
Patented Feb. 23, 1971

3,565,650
LIGHTWEIGHT CONCRETE PRODUCTS AND A PROCESS OF PRODUCING SAME
William A. Cordon, Logan, Utah, assignor of fifty percent to William A. Cordon, Paul H. Mills, and Robert D. Wheeler (together), and fifty percent to Taylor Industries Inc., Salt Lake City, Utah, a corporation of Utah
Filed May 18, 1966, Ser. No. 551,063
Int. Cl. C04b 13/02, 31/02
U.S. Cl. 106—97
8 Claims

ABSTRACT OF THE DISCLOSURE

A lightweight concrete product comprises concrete aggregate, which is at least about 50% by weight expanded perlite fines compressed into substantially interlocking relationship while containing absorbed water but substantially in the absence of free liquid, and portland cement bonding the aggregate together. The product is made by mixing concrete aggregate containing at least about 50% expanded perlite by weight with sufficient portland cement to bind the aggregate together when the mixture is compressed to the point of establishing interlocks between the particles of perlite fines to provide adequate green strength for handling, but with only so much water for hydrating the portland cement as will be absorbed by the perlite fines, and by thereafter compressing the mixture to establish the interlocks.

---

This invention relates to concrete products of various types made from a mix that comprises a lightweight aggregate and a bonding agent. It relates also to processes or methods utilized to produce such products.

The invention is concerned with producing concrete products that have adequate green strength to permit extensive handling without breaking, and that have, when set and cured, a ratio of flexural strength to weight two or three times that of other concrete products of generally similar nature, superior qualities of heat and sound insulation, superior fire resistance, and superior moisture stability. It is also concerned with producing such products economically and without excessive capital investment. One of the most important products of the invention is a hard, durable, and lightweight wallboard for either interior or exterior use that has high flexural strength relative to its weight.

In accordance with the invention, a heretofore little used form of the lightweight aggregate material known as "expanded perlite," or a material having similar properties, is utilized as a large portion of, if not the only, aggregate material for the concrete. This form of expanded perlite is known in the perlite trade as "waste fines" and usually constitutes that portion of the production of a perlite plant that will pass an ASTM Standard No. 30 mesh screen. Normally, use of such fine particles of expanded perlite is severely limited and they are often discarded as waste, for they so increase the water requirement in the making, for example, of a portland cement concrete slurry (about six times) that they are looked upon with much disfavor. However, they have been found to be ideal for the present purpose, since they impart several characteristics to the wet mix that have proven to be extremely important in the production of the desired products.

Thus, by utilizing a large portion of such expanded perlite fines in the wet mix, the quality of compressibility is achieved to an unusually great extent and with unusual functional effectiveness, regardless of the bonding agent utilized, thereby affording exceptionally high green strength, as welly as flexural strength, for the set and cured concrete; there is a highly advantageous absorption of a great quantity of water in those instances where an inorganic type of cement requiring water as a reaction agent is utilized, whereby adequate water is made available for the reaction and for continuing hydration, without slurrying the mix and thereby preventing effective compression; and there is tremendous surface area and a highly desirable pozzolanic action operative on such area, when an inorganic cement is utilized as the bonding agent, that add greatly to ultimate structural strength of the concrete.

Chemically speaking, expanded perlite is essentially amorphous silica with a small amount of alumina and traces of other minerals. Like any finely divided amorphous silica, it is pozzolanic and will react with alkalies in the presence of moisture to form a silica gel cement.

Microscopic examination of expanded perlite fines shows that individual particles are composed of microscopic pieces of glass (amorphous silica). Some are plate-like; some resemble long fibers; others are of various shapes. These tiny pieces of glass are bonded together in a porous fibrous-like structure, and, even though they become rearranged when the particle is compressed, their essential porosity is not lost.

The particles will absorb large quantities of water. When an equal weight of water is added to a mass of the particles, the water is entirely absorbed. When dry portland cement is added to the moist mass, it is completely dispersed among the individual particles of the expanded perlite fines. The usual cement paste or slurry is not formed, because of the substantial absence of free water. A similar mixture is produced when the perlite and portland cement are mixed dry and the water added afterward. The perlite fines apparently have the ability to absorb water so rapidly as to preclude the formation of a paste or slurry. The moist mixture of perlite fines, portland cement, and water is light and fluffy and will not bond together. However, when this moist mass is compressed, several bonding mechanisms occur which produce a very light and strong concrete.

Thus, being pozzolanic, the microscopic pieces of glass that make up the fine perlite particles combine chemically with a portion of the hydration product of the portland cement, $Ca(OH)_2$, and produce a silica gel. Large surface areas of the glass per unit weight are exposed, permitting extensive pozzolanic action to occur. The portland cement particles draw just enough moisture from the perlite particles to combine chemically. An unusually strong silica gel is formed, since the diluting and weakening effect of excess water is not introduced into the chemical reaction as it is in the case of portland cement mortars and concrete. Moreover, the intermingling of the silica gel produced by portland cement hydration and the silica gel produced by pozzolanic action tends to produce a continuous silica bond throughout the concrete.

When the moist, fluffy, perlite-portland cement mixture is compressed under pressures ranging from 100 to 200 p.s.i., a mechanical bond occurs due to aggregate interlock. The frictional resistance of interlocked particles stabilizes the concrete from a structural standpoint and is responsible for immediate green strength of the products. Other aggregates, such as sand, pumice, coarse perlite, can be employed along with the expanded perlite fines, so long as the latter are present in an amount which is about one-half the total aggregate weight of the mix.

From the foregoing, it is apparent that portland cement provides an ideal bonding agent for products made in accordance with the invention. Very real advantages are afforded by the water absorbability and pozzolanic nature of the expanded perlite fines. Utilizing these as the aggregate, a very light, fluffy and relatively dry concrete mix is obtained weighing about ten pounds per cubic foot where the volume of cement to volume of perlite fines is about 1 to 15 for aggregate weighing 6 lbs. per cu. ft. This can be compressed to about one quarter of its volume, in which condition it will weigh about thirty pounds per cubic foot and have a ratio of compressive to flexural strength of about three to one and a strength-weight ratio of about 10.3 pounds per sq. in. flexural strength per pound of concrete. Ordinary concrete has a compressive to flexural strength ratio of about ten to one and a strength-weight ratio of about 5.0.

There are many uses for perlite particles that will be retained on a No. 30 U.S. mesh screen. These particles, for example, have been expanded and used as aggregates for conventionally slurried concretes, they have horticultural uses and they can be used as aggregate for plaster. However, perlite particles passing a No. 30 mesh have not heretofore been considered useful except to a limited extent in plaster coat and paint finishes. Even when expanded, they have been found too small for most uses, or have such a high percentage of useless fine particles that they are not economically handled, and they are, therefore, classified in the industry as "waste fines."

Although, as has been noted, perlite has heretofore been used as a lightweight aggregate in the making of ordinary concrete, it has been the commercial coarse perlite, rather than the waste fines, that has been used, and the resulting aggregate-cement-water mix has been the usual paste or slurry.

Table I below shows the size number arbitrarily given to various unexpanded perlite particles having a particular nominal size. Thus, for example, those unexpanded particles having a nominal size such that they pass a No. 8 mesh while being retained or a No. 16 mesh, are classified Size 1, and, when further screened, on the average, have 1% retained on a No. 8 mesh, 79% retained on a No. 16 mesh, 15% on a No. 20 mesh, 1% on a No. 30 mesh, 1% on a No. 50 mesh, and 2% on a No. 100 mesh. After the particles classified size No. 1 have been expanded, 21% will be retained on the No. 8 mesh, 60% on the No. 16 mesh, 4% on the No. 20 mesh, 2% on the No. 32 mesh, and 2% on the No. 100 mesh.

TABLE I

| Size No. and typical weight | Nominal size limits, U.S. mesh | U.S. mesh | Unexpanded Perlite Ore Cumulative, percent retained | Unexpanded Perlite Ore Cumulative average, percent retained | Expanded perlite ore, cumulative typical expanded product, percent retained |
|---|---|---|---|---|---|
| 1, 12.0 lb. per cu. ft. | 8-16 | 8 | 0-2 | 1 | 21 |
| | | 16 | 70-90 | 80 | 81 |
| | | 20 | 90-100 | 95 | 85 |
| | | 30 | 93-100 | 96 | 91 |
| | | 50 | 95-100 | 97 | 93 |
| | | 100 | 97-100 | 98 | 95 |
| 2, 11.2 lb. per cu. ft. | 16-20 | 8 | 0 | 0 | 5 |
| | | 16 | 0-15 | 7 | 41 |
| | | 20 | 60-85 | 72 | 50 |
| | | 30 | 90-100 | 95 | 64 |
| | | 50 | 95-100 | 97 | 82 |
| | | 100 | 97-100 | 98 | 93 |
| 3, 12.2 lb. per cu. ft. | 20-30 | 8 | 0 | 0 | 0 |
| | | 16 | 0 | 0 | 11 |
| | | 20 | 0-25 | 12 | 69 |
| | | 30 | 60-80 | 70 | 88 |
| | | 50 | 95-100 | 97 | 93 |
| | | 100 | 97-100 | 98 | 96 |
| 4, 10.0 lb. per cu. ft. | 30-50 | 8 | 0 | 0 | 0 |
| | | 16 | 0 | 0 | 1 |
| | | 20 | 0 | 0 | 41 |
| | | 30 | 0-10 | 5 | 68 |
| | | 50 | 60-85 | 72 | 93 |
| | | 100 | 90-100 | 95 | 96 |
| 5, 5.6 lb. per cu. ft. | 50-100 | 8 | 0 | 0 | 0 |
| | | 16 | 0 | 0 | 0 |
| | | 20 | 0 | 0 | 0 |
| | | 30 | 0 | 0 | 6 |
| | | 50 | 0-25 | 12 | 80 |
| | | 100 | 80-100 | 90 | 91 |
| 6, 12.8 lb. per cu. ft. | 100-200 | 8 | 0 | 0 | 0 |
| | | 16 | 0 | 0 | 0 |
| | | 20 | 0 | 0 | 0 |
| | | 30 | 0 | 0 | 0 |
| | | 50 | 0 | 0 | 18 |
| | | 100 | 10-35 | 22 | 65 |
| | | 200 | 70-90 | 80 | 90 |

We have made numerous tests, varying the nature of aggregate used, to emphasize the advantageous characteristics of concrete products made using expanded waste fines in accordance with the process disclosed herein. The results, in terms of compressibility, weight, flexural strength, and strength-weight ratio, are given in the following Tables II and III. Table II also specifies the size number (from Table I) of the perlite used as aggregate in mixes 2–8.

TABLE II

| Mix No. | Mix proportions cement-water-aggregate (by weight) | Aggregate | Fresh unit weight (lb./cu. ft.) | Compressibility (1) (percent at 200 p.s.i.) |
|---|---|---|---|---|
| 1 | 1:1:1 | Natural sand | 123 | 0 |
| 2 | 1:1:1 | 80% sand, 20% fine perlite (size No. 5) | 94 | 0 |
| 3 | 1:1:1 | 50% sand, 50% fine perlite (size No. 5) | 70 | 51 |
| 4 | 1:1:1 | Coarse perlite (size No. 2) | 57 | 44 |
| 5 | 1:1(²):1 | Fine perlite (size No. 5) | 13 | 71 |
| 6 | 1:1:1 | 50% coarse perlite (size No. 3), 50% fine perlite (size No. 5) | 21 | 54 |
| 7 | 1:1:1 | Coarse perlite (size No. 3) | 39 | 38 |
| 8 | 1:1:1 | 50% coarse perlite (size No. 2), 50% fine perlite (size No. 5) | 23 | 52 |

¹ Compressibility is the ratio of the change in volume under a pressure of 200 p.s.i. to the original volume (expressed in percent).
² The proportion of water to fine perlite is not critical, but should be between ½ and 2 times the weight of the perlite. There should be substantially no free water in the mix.

TABLE III

| Mix No. | Dry unit wt., pressed (lb./cu. ft.) | 5 day flexural strength (p.s.i.) | Strength-weight ratio (p.s.i. per pound) |
|---|---|---|---|
| 1 | 118 | 262 | 3.0 |
| 2 | 77 | 170 | 2.2 |
| 3 | 56 | 170 | 3.0 |
| 4 | 46 | 200 | 4.4 |
| 5 | 33 | 340 | 10.3 |
| 6 | 40 | 255 | 6.4 |
| 7 | 54 | 210 | 3.9 |
| 8 | 40 | 252 | 6.3 |

From Table III it can be seen that the greatest strength-weight ratio occurred with mix No. 5, when the only aggregate used was perlite fines. This is because the perlite fines have such a low weight, i.e. 5.6 lbs. per cu. ft., a large degree of compressibility, and good mechanical interlock properties. It has been found also that where the same proportionate weight of perlite fines is used in concrete mixes the lower the weight of the expanded perlite particles used the greater the strength-weight ratio obtained.

We have made other tests comparing the compressed concrete of the invention with concrete also made with perlite fines but slurried with an excess of water in conventional manner. The results are shown by the following Table IV:

TABLE IV

| Mix | Proportions by wt. (gms.) Fine perlite | Proportions by wt. (gms.) Portland cement | Proportions by wt. (gms.) Water | Compressive strength (lbs.) | Flexural strength, lbs. (28 day) |
|---|---|---|---|---|---|
| Moist pressed mix | 300 | 300 | 300 | 1,675 | 720 |
| Regular slurried mix | 300 | 300 | 1,950 | 184 | 75 |

It is seen that the compressed moist mix of the invention produced a product having about nine times the strength of a similar product made with similar materials but slurried in conventional manner.

In general, it can be said that a compressibility of about 50%, at least, is necessary to establish satisfactory green strength for a pressed concrete product in accordance with the invention. This is not obtainable with a conventional aggregate, such as sand or coarse expanded perlite, unless it is mixed with about 50% by weight, at least, expanded perlite fines. Expressed somewhat differently, it can be said that the compressibility of a moist mix having a mixture of aggregates must be at least 70% of the compressibility of a moist mix having expanded perlite fines as the only aggregate.

As has been noted, the best strength-weight ratio for a portland cement product of the invention will be obtained when all the aggregate is expanded perlite fines, for this gives a moist mix with the greatest compressibility. The amount of water utilized should not be enough to produce any slurrying amount of free water during compression of the mix. It should be also realized that the more portland cement used, the heavier will be the product. Therefore, no more should be used in the moist mix than will give the maximum strength desired for the product. A proportion by weight of one part portland cement to one part of the total aggregate employed has been found desirable for many products.

A specific procedure for the manufacture of wallboard is illustrated schematically in the accompanying drawing to indicate what is presently contemplated as the best mode of carrying out the invention.

In the drawing, the single figure is a schematic, fragmentary representation of a production line for the manufacture of the wallboard.

In the making of pressed wallboard in the form of relatively thin panels, e.g. from about ¼ to about 1 inch in thickness, for use as heat insulating, exterior siding, for example, in building construction, a flat conveyor belt 10 of some suitable flexible material, such as ordinary reinforced rubber belting having its working surface treated, as by the application of a layer of smooth and flexible plastic matreial or stainless steel, or other suitable material that is impervious to moisture, is mounted on closely spaced idler rollers 11 and head and tail pulleys 12 as a belt conveyor for continually receiving materials deposited on its working face, for carrying such materials through sets of upper and lower pressure rollers 13 and 14, respectively, for carrying the resulting continuous strip of wallboard 15 through a transverse cutter 16, where it is cut into individual lengths, and for discharging the individual lengths. A belt 17 around the upper pressure rollers 13 can be driven by a roller 18 to help force material to be compressed between the sets of pressure rollers.

In the illustrated instance, the belt 10 advances under a hopper 19 to receive a thin deposit of decorative aggregate chips; passes on to a hopper 20, where a layer of light and fluffy, but rich, concrete mix of expanded perlite fines, portland cement, and water ( e.g. 1:10:1 parts by weight, respectively) in accordance with the invention is deposited on the decorative chips; passes on to a hopper 21, where a considerably thicker layer of a much leaner, light and fluffy, concrete mix (e.g. 1:1:1 parts by weight, respectively) is deposited on the rich mix; passes under a hopper 20, where a rich concrete mix corresponding to that in hopper 18 is deposited on a lean mix layer; passes through the bight of a first set of pressure rollers 13, 14, which exercises an initial compression pressure ( e.g. 150 p.s.i.) on the several deposited layers; and passes through the bight of a second set of pressure rollers 13, 14, which further compresses the several deposited layers before passing beneath cutter 16. The resulting building board, or construction panel, has unusually hard, and impervious outer surfaces of a more dense concrete, one of which surfaces is faced with imbedded decorative chips and a core layer of lighter weight and less dense concrete. This wall board has an unusually good strength-weight ratio, water, fire, and sound resistance and a very attractive appearance.

Other types of building board can be produced for either indoor or outdoor use, or both. For example, merely depositing the lean concrete mix of hopper 19 on the belt 10 and passing it through a set of the pressure rollers 13, 14 will produce a smooth and lightweight panel that has sufficient flexural strength and heat insulating capacity to serve a variety of useful purposes in building construction. If desired, anyone of a variety of types of facings can be applied to one or both faces of such a panel. For example, sheets of paper material similar to that used on conventional gypsum wall board, i.e. so-called "plaster board" can be used.

A variety of other pressed concrete products can be produced in accordance with the present invention, it being only necessary to exert a desired degree of compression on a concrete mix conforming to the teachings herein, usually within a mold conforming to the shape and surface characteristics of the desired product.

Whereas this invention is here described and illustrated with respect to certain forms thereof, it is to be understood that many variations are possible without departing from the subject matter particularly pointed out in the following claims, which subject matter I regard as my invention.

I claim:

1. A method of producing lightweight concrete products, comprising mixing concrete aggregate, which is at least about 50% by weight expanded perlite fines, with sufficient portland cement to bond said aggregate together when the mixture is compressed to the point of establishing interlocks between the particles of said expanded perlite fines, so the product has green strength for handling, and with only so much water for hydrating said portland cement as will be absorbed by the perlite fines; and compressing the mixture to establish said interlocks.

2. A method in accordance with claim 1, wherein the aggregate consists substantially solely of expanded perlite fines.

3. A method in accordance with claim 2, wherein the aggregate, the cement, and the water are present in the mix in ratio of about one to one to one, respectively, by weight.

4. The product of the method of claim 1 in which said 50% by weight of expanded perlite particles pass an ASTM Standard No. 30 mesh screen.

5. A product in accordance with claim 4, in panel form as building board.

6. A product in accordance with claim 4, wherein the concrete aggregate consists substantially solely of expanded perlite fines.

7. A product in accordance with claim 6, in panel form as building board.

8. A product in accordance with claim 4, wherein the concrete aggregate consists substantially solely of expanded perlite fines, and the bonding agent is portland cement in proportion of substantially one to one with said aggregate by weight.

References Cited

UNITED STATES PATENTS

| | | | |
|---|---|---|---|
| 2,501,699 | 3/1950 | Stecker | 106—Perlite |
| 2,585,366 | 2/1952 | Bollaert et al. | 106—98 |
| 2,634,207 | 4/1953 | Miscall et al. | 106—Perlite |
| 2,727,827 | 12/1955 | Chertkof | 106—97 |
| 2,858,227 | 10/1958 | Rodsky | 106—97 |
| 2,878,131 | 3/1959 | Houston et al. | 106—Perlite |
| 3,372,040 | 3/1968 | Ware | 106—97 |
| 2,600,812 | 6/1952 | Thomas | 106—84 |

OTHER REFERENCES

Lea & Desch, The Chemistry of Cement and Concrete, Edward Arnold Ltd., London, 1956, pp. 339, 340, 512.

TOBIAS E. LEVOW, Primary Examiner

W. T. SCOTT, Assistant Examiner

U.S. Cl. X.R.

106—98; 264—112, 122, 255